April 28, 1953
C. N. KIMBERLIN, JR
2,636,865
PREPARATION OF ALUMINA FROM HIGHER
ALCOHOLATES OF ALUMINUM
Filed Nov. 19, 1948
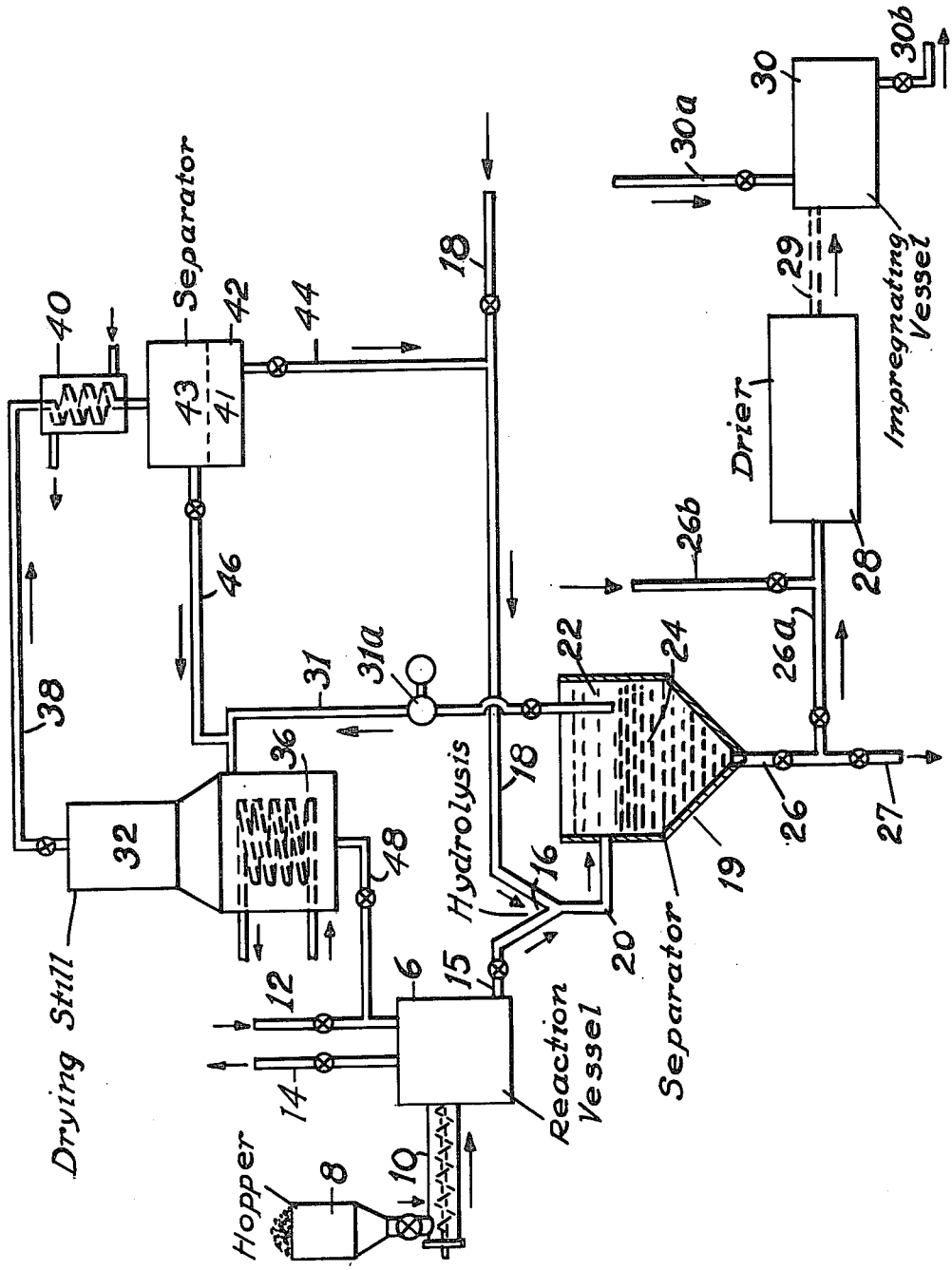
Charles N. Kimberlin, Jr. Inventor
By George J. Silhavy Attorney

UNITED STATES PATENT OFFICE 2,636,865

PREPARATION OF ALUMINA FROM HIGHER ALCOHOLATES OF ALUMINUM

Charles N. Kimberlin, Jr., Baton Rouge, La., assignor to Standard Oil Development Company, a corporation of Delaware Application November 19, 1948, Serial No. 60,864

13 Claims. (Cl. 252—463)

1

This invention relates to a process for the preparation of contact or catalytic substances such as alumina and/or alumina based catalysts or contacting agents and a method of treating hydrocarbons such as hydroforming and catalytic cracking and the like using said catalysts or contacting agents.

The method of making alumina from aluminum metal by forming an alcoholate and hydrolyzing the aluminum alcoholate is known in the art. However, this method of making alumina has not been considered commercially practicable because of the expensive procedures necessary to recover the alcohol used in the process. It has been difficult to treat the alcohol-water mixture resulting from the hydrolysis step to recover the alcohol for reuse and the distillation procedures necessary have made the process of little commercial value.

In the drawing, the figure represents one embodiment of an apparatus for carrying out this invention.

It is the object of this invention to provide an improved economical and practical process for the preparation of alumina and/or alumina based catalysts or contacting agents by the hydrolysis of the alcoholate of aluminum and recovering the alcohol for reuse by decantation of a separated liquid phase.

It is a further object of this invention to treat hydrocarbons as by hydroforming, catalytic cracking and the like in the presence of alumina and/or alumina based catalysts or contacting agents.

Factors which contribute to the commercial practicability of this invention include (1) the low cost of aluminum metal compared with any of the aluminum salts as a source of alumina, (2) the elimination of all necessity for washing, (3) the simplicity of the processing steps involved in the manufacture and (4) the use of a substantially water-insoluble alcohol to insure substantially complete alcohol recovery.

The material prepared in accordance with this method are characterized by high purity and high surface area.

According to this invention an alcohol which is insoluble or nearly insoluble in water is chosen for the formation of the alcoholate by reaction with metallic aluminum. An aliphatic alcohol of the general formula $C_nH_{2n+1}OH$ where $n$ is 4 or greater may be used but the alcohols where $n$ is 5 or greater are preferred. The $C_5$ and higher alcohols are less soluble in water than the $C_4$ alcohols and are therefore preferred in this process.

2

The $C_4$ alcohols have a solubility in water under standard conditions of 9 or more grams per 100 cc. of water whereas the $C_5$ and higher alcohols (except tertiary amyl alcohol) have a solubility in water under standard conditions of about 5.3 or less grams per 100 cc. of water. For this invention, the maximum allowable solubility of the alcohol in water under standard conditions is about 15 grams of alcohol per 100 cc. of water but the preferred maximum solubility of the alcohol in water under standard conditions is about 5.3 grams of alcohol per 100 cc. of water.

For the present process the alcohol must be essentially anhydrous and the commercial anhydrous amyl alcohols are satisfactory. The alcohols which may be used in this process include n-butyl alcohol, secondary butyl alcohol, isobutyl alcohol but while, as pointed out above, these alcohols are operable, they are much less satisfactory and the following higher molecular weight alcohols are preferred: pentanol-1, pentanol-2, 2 methyl butanol-4, 2 methyl butanol-3, pentanol-3, hexanol - 1, hexanol - 2, hexanol - 3, the various methyl pentanols, the various dimethyl butanols, the various heptyl alcohols, the various octyl alcohols, etc. including those alcohols substantially insoluble in water and liquid at the temperature of operation of the process.

Instead of using any one of the alcohols singly, mixed alcohols such as mixed amyl alcohols may be used. Mixtures of alcohols of different molecular weights may be used.

In order to further facilitate the separation of the alcohol from the water and in the preferred form of this invention, a hydrocarbon, such as a petroleum distillate boiling within the range of 200° F. to 500° F. or higher and preferably in the range of 300° F. to 400° F. is added to the alcohol. Although the addition of the hydrocarbon is not necessary to the process, the use of the hydrocarbon diluent is preferred and has the following advantages:

(1) The diluent aids in controlling the reaction of the alcohol and aluminum metal. Heat in the order of 10,000 B. t. u. per pound of aluminum oxide formed upon hydrolysis is liberated during the formation of the alcoholate and the use of the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol from the aluminum oxide slurry after hydrolysis.

In the presence of a small amount of a catalyst in the present process, aluminum metal is reacted with the alcohol-hydrocarbon mixture and the resulting alcoholate is then hydrolyzed with an excess of water or an aqueous solution such as a hydrosol. This hydrolysis results in the formation of a hydrous alumina which is dispersed in the aqueous phase in the form of a slurry.

The formation of the aluminum alcoholate takes place in accordance with the following equation:

*Equation I*

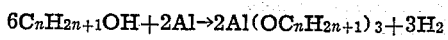
$$6C_nH_{2n+1}OH + 2Al \rightarrow 2Al(OC_nH_{2n+1})_3 + 3H_2$$

The hydrogen is in the gaseous state and escapes from the reaction. Upon hydrolysis, the aluminum alcoholate undergoes the following change:

*Equation II*

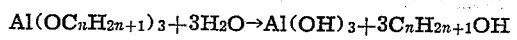
$$Al(OC_nH_{2n+1})_3 + 3H_2O \rightarrow Al(OH)_3 + 3C_nH_{2n+1}OH$$

the alcohol being reformed and going into solution again with the hydrocarbon.

The alcohol which is reformed or regenerated by the hydrolysis step together with the hydrocarbon forms a layer separate and distinct from the slurry of water and hydrous alumina and is easily recovered and removed by a simple process of decanting or the like. The slurry of hydrous alumina is removed for further treatment.

The alcohol-hydrocarbon mixture contains a small amount of residual water as entrained and dissolved water and is freed from this residual water by a simple process of distillation for reuse in the process. The overhead gases from the drying still are condensed, the condensate allowed to settle, and upon settling, separates into a water layer and an alcohol-hydrocarbon layer, the latter being recycled to the drying still. The dried alcohol-hydrocarbon mixture is removed from the bottom of the drying still and is ready for further reaction with additional metallic aluminum.

If an alumina gel is desired, the slurry of hydrous alumina obtained as described above may be dried and activated by application of heat. If it is desired to modify the properties of the gel, the slurry may be treated in various ways before drying, i. e., the hydrogen ion concentration may be adjusted, an aging treatment at controlled temperatures may be used, or a peptizing agent may be added to convert the alumina into a hydrosol.

If an alumina based catalyst is desired, the slurry may be treated with an impregnating solution of a catalytic material before drying, e. g. a solution of ammonium molybdate, chromic acid, or other catalytic or promoter agent may be added to the slurry. If desired, the aqueous solution used to hydrolyze the aluminum alcoholate may be a solution containing a catalytic or promoter agent.

According to this invention, petroleum naphtha and similar hydrocarbon mixtures containing appreciable quantities of naphthenes can be subjected to a reforming operation to yield a liquid product of improved octane number boiling within the gasoline range. Depending upon reaction conditions, catalytic reforming operations are generally referred to as either hydroforming or aromatization reactions. By hydroforming is ordinarily meant an operation conducted at elevated temperatures and pressures in the presence of a solid catalyst and added hydrogen wherein a hydrocarbon fraction is increased in aromaticity and wherein there is no net consumption of hydrogen. The term aromatization refers to an operation in which a hydrocarbon or hydrocarbon fraction is treated at elevated temperatures but at substantially atmospheric pressure in the presence of a solid catalyst for the purpose of increasing the aromaticity of the hydrocarbon or hydrocarbon fraction.

Catalytic reforming operations are usually carried out at temperatures of around 850 to 1100° F. in the presence of such catalysts as molybdenum oxide, chromium oxide and the like. These catalysts are usually supported on a base or carrier, the mostly commonly used base being alumina. In this invention, alumina based catalysts consisting of one or more of the group VI oxides such as molybdenum oxide or chromium oxide, supported on alumina have been prepared and used as reforming catalysts.

In addition to the reforming processes, high boiling hydrocarbon materials may be converted to low boiling hydrocarbon materials by a process of catalytic cracking carried out by subjecting the high boiling hydrocarbon material to active conditions of temperature and pressure for sufficient period of time in the presence of catalysts such as alumina, alumina-boria, alumina-silica, alumina-magnesia, alumina-silica-magnesia and the like. The catalysts may be in the form of fixed or moving bed with the vaporized high boiling hydrocarbon material passing therethrough or the so-called fluid technique may be used in which the catalyst material is suspended in vapors of high boiling hydrocarbon material during reaction time. Other catalytic conversions of hydrocarbons may be used in this process.

Referring to the drawing, numeral 6 represents a reaction vessel which is adapted to contain the reactants. Metallic aluminum such as aluminum chips, aluminum turnings, or the like is charged into the vessel 6 from storage hopper 8 by means of screw conveyor 10. If desired, an alloy of aluminum may be used as a source of the aluminum metal where the aluminum forms at least 90% of the total composition of the alloy. For example, an alloy of 96% aluminum and 4% copper may be used.

The reaction may be carried out without the use of any promoter or catalyst but in general, it is more satisfactory to use a small amount of a catalytic substance such as mercury, a mercury salt, iodine or an aluminum halide, mercuric chloride being preferred. The promoter or catalytic material is added to vessel 6 to promote the reaction between the aluminum metal and alcohol. Through line 12, a substantially anhydrous water-insoluble alcohol alone, or in admixture with a hydrocarbon, is added to vessel 6. The mixture is preferably one containing an amyl alcohol and a petroleum distillate boiling substantially within the range of 200° F. to 500° F. in ratio of 50% hydrocarbon, 50% alcohol by volume; however, a mixture of the amyl alcohol and hydrocarbon containing hydrocarbon in the range of 0% to 90% of the total volume may be used.

It is generally necessary to heat the mixture of aluminum, mercuric chloride, and alcohol-hydrocarbon to initiate the reaction between the metal and the alcohol. Suitable heating means (not shown) such as a burner, a heating coil, etc. are provided for vessel 6 for heating the contents thereof. However, after the reaction is well started, it is normally self-sustaining and cooling is usually necessary. This cooling may be carried out by immersing a cooling coil (not shown) into vessel 6. With a 50/50% by volume mixture of amyl alcohol and a hydrocarbon diluent having a boiling range of 300 to 400° F., the temperature in vessel 6 may vary between about 250 and 280° F. In a batch process or when using higher boiling alcohols or when different proportions of alcohol and hydrocarbon diluent are used, different temperatures may be obtained such as within a range of 200–300° F. Vessel 6 is equipped with line 14 for removing gaseous products including hydrogen from the reaction which occurs in accordance with Equation I. The hydrogen produced is equivalent in purity to that produced electrically. It may be cooled and passed through a separator which strips from it any entrained liquid, the liquid being returned to vessel 6 and the hydrogen filtered, compressed and stored by means of equipment not shown.

From reaction vessel 6, the products of the reaction comprising a solution of aluminum alcoholate in hydrocarbon and excess alcohol are passed through line 15 and into a hydrolysis zone 16. In this zone, which may be a two-fluid nozzle, a centrifugal pump, or any other device for simultaneously contacting two fluids, each with the other, the reaction products from vessel 6 are contacted with water or an aqueous solution such as a hydrosol or any impregnating solution from line 18. Here the aluminum alcoholate is hydrolyzed forming hydrous alumina and regenerating the alcohol in accordance with Equation II. The temperature in nozzle 16 may be between about 70° F. and 200° F.

From the hydrolyzing zone 16, the mixture of hydrocarbon, regenerated alcohol, water and hydrous alumina is transferred to separating vessel 19 through line 20. In this vessel, the mixture may be allowed to remain substantially quiescent for a period of about 1 to 10 hours, but very slow stirring aids the separation. Here the mixture separates into two distinct layers, the upper alcohol and hydrocarbon layer as shown at 22 and the lower water layer containing hydrous alumina in the form of a slurry as shown at 24. The vessel 19 and its contents should be maintained at a temperature of about 70° to 200° F., preferably 150 and 180° F. since settling appears to be somewhat better in this range. The water or aqueous solution such as a hydrosol or an impregnating solution added to the hydrolyzing zone 16 through line 18 should be in such amounts so as to give about a 3% to 5% slurry of alumina or impregnated alumina in the aqueous layer. For example, for each 100 grams of aluminum metal used about 4 to 6 liters of water or aqueous solution should be used. This slurry is readily concentrated to as high as 10% solids content by continued settling. Water is withdrawn off the top of the settled slurry and reused in the hydrolysis step to recover any suspended alumina it may contain.

The slurry of hydrous alumina is withdrawn from the bottom of settling tank 19 through line 26. It may be passed from line 26 through line 27 to another settling chamber (not shown) to concentrate the slurry further. If it is desired, the concentrated slurry of alumina may be mulled with a drying catalytic component such as zinc oxide in equipment not shown.

The slurry may also be passed from line 26 into line 26a. Impregnation of the slurry in line 26a may be brought about by introducing a solution of a catalytic component through line 26b. The impregnated alumina slurry may then be dried in dryer 28. However, if an alumina gel is desired, the slurry may be withdrawn from settling tank 19 through line 26 and passed directly into dryer 28 by means of line 26a. The drying temperature in drying chamber 28 may vary between 220° F. to 500° F., depending upon the catalytic material treated and the results desired.

If it is desired to impregnate the dried catalytic material, this may be done by transferring the dried catalytic material from dryer 28 to vessel 30 by a screw conveyor or other means identified by reference character 29. A solution of the desired catalytic component may be introduced into the dried catalytic material in vessel 30 through line 30a. After a sufficient contacting period, the impregnated catalytic material and excess impregnating solution may be withdrawn through line 30b.

The alcohol and hydrocarbon mixture in layer 22 of settling tank 19 is withdrawn through line 31 by means of pump 31a to a drying still 32 where any dissolved or entrained water is removed by a simple distillation. Heat for the distillation is furnished by a coil 36 but any other method of supplying heat necessary to raise the distillation apparatus to the desired temperature may be used. For a 50–50% by volume mixture of amyl alcohol and a hydrocarbon diluent boiling within a range of from 300 to 400° F. this temperature will be about 250° F. to 280° F. The vaporized water which carries with it some small portion of the alcohol-hydrocarbon mixture passes from the top of drying still 32 through line 38 and then through condensing coil 40 to settling tank 42. Gravity separation takes place in settling tank 42 to form a bottom water layer 41 and a top hydrocarbon-alcohol layer 43. The water is withdrawn from settling tank 42 through line 44 and is passed into line 18 for reuse in the hydrolysis step. Any alcohol and/or hydrocarbon dissolved in the water is returned to the system with the water.

The alcohol-hydrocarbon layer in settling tank 42 passes through line 46 and into line 31 where it is reintroduced into drying still 32.

The alcohol-hydrocarbon mixture that has been substantially completely freed of any dissolved or entrained water by drying still 32 is passed through line 48 into line 12 for recirculation to vessel 6. The temperature of the mixture in line 48 will be at the boiling temperature of the mixture being used.

The invention is further described and illustrated by the following examples.

*Example 1*

54 g. of aluminum turnings were dissolved in two liters of a mixture of anhydrous n-amyl alcohol and a petroleum distillate boiling within a range of from 300 to 400° F. The mixture of alcohol and petroleum distillate was in a ratio of one part of alcohol to one part of petroleum distillate, by volume. A small amount of mercuric chloride, about 0.001 part of mercuric chloride per part of aluminum metal by weight was added. To initiate the reaction, the mixture was heated to boiling, after which the reaction proceeded to completion without further heating.

The solution of aluminum amylate thus obtained was hydrolyzed with 3.5 liters of distilled water. There was formed an aqueous slurry of hydrous alumina, from which the petroleum distillate-regenerated alcohol mixture readily separated as a separate liquid layer. This liquid layer was decanted and dried by distilling off the water and reused in a subsequent preparation without further treatment.

The alumina slurry was allowed to settle overnight and the layer of clear water was decanted, leaving a concentrated slurry containing approximately 8% alumina. This concentrated slurry was dried in an oven at 220° F. and then activated by heating to 850° F. The product was a hard, highly adsorptive alumina gel. Its surface area was 356 square meters per gram, which is one of the highest ever encountered for pure alumina. This product has many uses. It may be used as adsorptive agent, as a catalyst or as a catalyst base in desulfurization processes and the like.

Example 2

27 grams of aluminum were dissolved in 1 liter of 50-50 anhydrous normal amyl alcohol-petroleum distillate solution as described in Example 1. The solution of alcoholate was treated with 2 liters of 0.1 N-acetic acid. There was formed a slurry of hydrous alumina from which the petroleum distillate and regenerated alcohol were decanted and dried for reuse as described in Example 1. The slurry was placed in an oven at 220° F. After a few hours in the oven the alumina had become peptized, forming a hydrosol rather than the slurry of gelatinous alumina. After about ½ of the water had evaporated, the hydrosol set to a clear hydrogel. A part of this hydrogel was removed from the oven and treated with water, whereupon it became dispersed, reverting to a hydrosol.

The remainder of the hydrogel was completely dried and activated by heating to 850° F. The product was a hard, highly adsorptive alumina gel which was somewhat more glassy than the gel of Example 1. Its surface area was 346 square meters per gram.

Example 3

270 grams of aluminum were dissolved in 10 liters of a 50-50 normal amyl alcohol-petroleum distillate mixture as described in Example 1. The solution of alcoholate was hydrolyzed by treatment with 17.5 liters of distilled water. The petroleum distillate and regenerated alcohol layer was decanted and dried for reuse as described in Example 1.

The alumina slurry was concentrated by settling to approximately 8% solids content. There were then added to the alumina slurry 680 cc. of ammonium molybdate solution containing 55.5 grams of molybdenum oxide. The mixture was dried in an oven at 240° F. and then activated by heating at 850° F.

The product was a hard, adsorptive catalyst comprising 10% molybdenum oxide on alumina gel. Its surface area was 380 square meters per gram. This catalyst was used to hydroform an East Texas virgin naphtha boiling within a range of 267 to 418° F. and having a CFR-research octane number of 41.7. In the series of runs, the following operating conditions were established:

Pressure, p. s. i. g. _____ 200
Average catalyst temp., °F _____ 929
V./v./hr.[1] _____ .97
Hydrogen CF/B [2] _____ 1970

[1] Volumes of liquid feed per volume of catalyst per hour.
[2] Cubic ft. of hydrogen under standard conditions per barrel of feed.

Under these conditions, the following yields were obtained:

Gasoline, volume percent _____ 82.0
CFR-Research Octane No _____ 95.0
Carbon, weight percent on feed _____ .20

Example 4

432 g. of aluminum turnings were dissolved in 16 liters of a 50-50 mixture of anhydrous normal amyl alcohol and a petroleum distillate boiling in the range of from 300° F. to 400° F. A small amount of mercuric chloride, about 0.0005 part of mercuric chloride, per part of aluminum by weight, was used as a catalyst to dissolve the metal. To initiate the reaction, the mixture was heated to boiling by means of a steam coil. After the reaction was well started, cooling was necessary. The cooling was done by means of a coil immersed in the reaction mixture. Toward the end of the reaction, the mixture was again heated to complete the solution of the metal. About 30 minutes is required for the reaction between the aluminum and the alcohol by the procedure described.

The solution of aluminum amylate thus obtained was hydrolyzed with 16 liters of distilled water. The hydrolysis was accomplished by pumping the aluminum amylate solution and the water simultaneously through a small centrifugal pump. The feed lines to the pump were so constructed that the two streams were mixed just before reaching the impeller of the pump. The discharge from the pump was placed in a vessel and allowed to remain quiescent for about 10 minutes at the end of which time the petroleum distillate-regenerated alcohol mixture and the aqueous slurry of alumina had separated as two distinct liquid layers. The petroleum distillate-regenerated alcohol layer was decanted and dried by distilling off the small amount of water and reused in a subsequent preparation without further treatment.

To the layer comprising the aqueous slurry of alumina was added acetic acid in the ratio of about 5 liters of acetic acid per 100 pounds of aluminum metal. After standing for 1 hour, there were then added to the acidified alumina slurry 1000 cc. of an ammonium molybdate solution containing approximately 90.5 g. of molybdenum oxide. The mixture was dried in an oven at 250° F. and then activated by heating to 850° F.

The product was a hard, adsorptive material comprising 10% molybdenum oxide on alumina gel. Its surface area was 372 square meters per gram. An East Texas virgin naphtha boiling in the range of 267° F. to 418° F. and having a CFR-research octane number of 41.7 was passed over the catalyst described in Example 4 under conditions of 930° F., 200 p. s. i. g., a feed rate of 0.49 volume of naphtha per volume of catalyst per hour and with hydrogen introduced into the reactor at the rate of 1580 standard cu. ft. per barrel of naphtha feed. The process period was 12 hours. There was obtained a liquid product and 75.5 volume per cent yield based on the naphtha feed having a CFR-research octane number of 100.1.

After the process period was completed, the catalyst was regenerated by burning off carbon amounting to 0.79 weight per cent of naphtha feed. After regeneration, the process period feeding naphtha was repeated.

Example 5

A slurry of hydrous alumina was prepared from 432 g. of aluminum metal as described in Example 4. Acetic acid in the ratio of 5 liters of acetic acid per 100 lb. of aluminum metal was added to the slurry. Then after standing for 24 hours, there were added to the acidified alumina slurry 1000 cc. of a solution containing approximately 90.5 g. of molybdenum oxide. The mixture was dried in an oven at 250° F. and then activated by heating at 850° F.

The product was a hard, adsorptive material comprising 10% molybdenum oxide on alumina gel. Its surface area was 405 square meters per gram. It is useful in hydroforming processes.

Example 6

A slurry of hydrous alumina was prepared from 432 g. of aluminum metal as described in Example 4. 110 cc. of ammonium hydroxide solution containing 27 g. of ammonia were added to the alumina slurry. There were then added 1000 cc. of an ammonium molybdate solution containing approximately 90.5 g. of molybdenum oxide. The impregnated slurry was dried in an oven at 250° F. and then activated by heating to 850° F.

The product was a hard, adsorptive material comprising 10% molybdenum oxide on alumina gel. Its surface area was 328 square meters per gram. It is useful in hydroforming processes.

Example 7

A slurry of hydrous alumina was prepared from 432 g. of aluminum metal as described in Example 4. The slurry was dried in an oven at 250° F. The dried alumina gel was ground to a powder and then thoroughly mixed with 500 cc. of a solution of ammonium molybdate containing approximately 90.5 g. of molybdenum oxide. The gel was then redried in an oven at 250° F. and activated by heating to 850° F.

The resultant impregnated, activated gel comprised 10% molybdenum oxide on alumina gel and had a surface area of 388 square meters per gram. It is very useful in hydroforming processes.

Example 8

A slurry of hydrous alumina was prepared from 432 g. of aluminum metal as described in Example 4. To this slurry was added in succession 500 cc. of a solution of calcium nitrate containing approximately 23.4 g. of calcium oxide and 1000 cc. of a solution of ammonium molybdate containing approximately 93.4 g. of molybdenum oxide. The impregnated slurry was then dried in an oven at 250° F. and the dry gel was activated by heating to 850° F.

The product was a hard, adsorptive catalytic material comprising 87.5% aluminum oxide, 10% molybdenum oxide and 2.5% calcium oxide. It had a surface area of 343 square meters per gram. This catalyst was used to hydroform an East Texas virgin naphtha boiling within a range of 267 to 418° F. and having a CFR-research octane number of 41.7. In the series of runs, the following operating conditions were established:

| | |
|---|---|
| Pressure, p. s. i. g | 200 |
| Average catalyst temp., °F | 930 |
| V./v./hr.[1] | 0.94 |
| Hydrogen CF/B[2] | 1530 |

[1] Volumes of liquid feed per volume of catalyst per hour.
[2] Cubic ft. of hydrogen under standard conditions per barrel of feed.

Under these conditions, the following yields were obtained:

| | |
|---|---|
| Gasoline, volume per cent | 87.6 |
| CFR-Research Octane No | 84.6 |
| Carbon, weight per cent on feed | 0.0 |

Example 9

A solution of aluminum amylate was prepared as described in Example 4 by dissolving 432 g. of aluminum metal in 16 liters of a 50–50 mixture of amyl alcohol and a petroleum distillate boiling in the range of 300° F. to 400° F., in the presence of 0.2 g. of mercuric chloride.

A silica hydrosol was prepared by passing 3650 cc. of a solution of sodium silicate ($Na_2O.3.25SiO_2$) containing 30 g. of silicon dioxide per liter through a bed of 2250 cc. of an acid regenerated cation exchange resin. Any commercial cation exchange resin such as an insoluble polymer prepared from acidic monomers such as phenols, phenol sulphonic acid or phenol carboxylic acid, on a sulphonated carbonaceous material such as sulphonated coal, sulphonated peat, etc. may be used. Amberlite IR–100 (Resinous Products Co.) believed to be made by reacting a phenol sulphonic acid with formaldehyde was used in this example. This sol prepared in this manner gave an acid reaction toward litmus and contained approximately 28 g. of silicon dioxide per liter.

1570 cc. of the above silica sol was diluted to 16 liters with distilled water and this diluted sol was used to hydrolyze the aluminum amylate solution. The hydrolysis was accomplished by passing the two liquids simultaneously through a centrifugal pump as described in Example 4. Upon settling there formed an aqueous slurry of hydrous alumina and hydrous silica from which the petroleum distillate-regenerated alcohol readily separated as a separate liquid layer. This liquid layer was decanted and dried by distilling off the residual water and was reused in a subsequent preparation without further treatment.

The aqueous slurry of hydrous alumina and hydrous silica was dried in an oven at 250° F. and activated by heating at 850° F.

The product which is useful as a cracking catalyst was a hard, adsorptive alumina-silica catalyst comprising 95% aluminum oxide and 5% silicon dioxide. Its surface area was 429 square meters per gram.

Example 10

An aqueous slurry of hydrous alumina and hydrous silica was prepared according to Example 9. There were added 1000 cc. of a solution of ammonium molybdate containing approximately 95.5 g. of molybdenum trioxide. The mixture was dried in an oven at 250° F. and activated by heating to 850° F.

The resultant impregnated alumina-silica gel was comprised of 85.5% aluminum oxide, 4.5% silicon dioxide and 10% molybdenum oxide and had a surface area of 452 square meters per gram. It is useful as a hydroforming catalyst.

Example 11

An aqueous slurry of hydrous alumina and hydrous silica was prepared according to Example 9. Acetic acid was added in the ratio of 5 liters of acetic acid per 100 pounds of aluminum metal and the mixture was allowed to set for 24 hours. There were then added 1000 cc. of ammonium molybdate solution containing approximately 95.5 g. of molybdenum oxide. It was then dried in an oven at 250° F. and activated by heating at 850° F.

The product which is useful as a hydroforming catalyst was a hard adsorptive material comprising 85.5% aluminum oxide, 4.5% silicon dioxide, and 10% molybdenum oxide, and had a surface area of 423 square meters per gram.

Example 12

A slurry of hydrous alumina was prepared from 432 g. of aluminum metal as described in Example 4. The slurry was evaporated in an oven to a solids content of 12.5%. To this was added 650 g. of dry process zinc oxide made by burning zinc metal in air and acetic acid in the ratio of 5 liters of acetic acid per 100 pounds of aluminum metal. The mixture was mixed in a ball mill for 1 hour. Then there were added 184 g. of powdered ammonium molybdate (81.4% $MoO_3$) and the ball milling was continued for an addition 1.5 hours. The mixture was then dried in an oven at 250° F. and activated by heating to 850° F.

The product was a hard, adsorptive material comprising 90% zinc aluminate and 10% molybdenum oxide and had a surface area of 209 sq. meters per gram. It is useful as a hydroforming catalyst.

Example 13

A slurry of hydrous alumina was prepared from 432 g. of aluminum metal as described in Example 4. The slurry was then impregnated with 200 cc. of a solution of cerium nitrate containing approximately 7.5 g. of cerium oxide ($Ce_2O_3$), 300 cc. of a solution of potassium dichromate containing approximately 10.9 g. of potassium oxide and approximately 17.6 g. of chromium oxide ($Cr_2O_3$), and 500 cc. of a solution of ammonium dichromate containing approximately 108.6 g. of chromium oxide. The mixture was dried in an oven at 250° F. and activated by heating at 850° F.

The product was a hard, adsorptive material comprising 86.6% aluminum oxide, 11.5% chromium oxide, 1.1% potassium oxide, and 0.8% cerium oxide, and had a surface area of 343 square meters per gram. It is useful as an aromatization or low pressure (25–75 p. s. i. g.) hydroforming catalyst.

Example 14

A slurry of hydrous alumina was prepared from 432 g. of aluminum metal as described in Example 4.

A silica hydrosol containing approximately 28 g. of silicon dioxide per liter was prepared as described in Example 9.

2040 cc. of the silica hydrosol were added to the hydrous alumina slurry. It was then impregnated with 100 cc. of a solution of cerium nitrate containing approximately 18.2 g. of cerium oxide, 200 cc. of potassium dichromate containing approximately 13.6 g. of potassium oxide and 22 g. of chromium oxide, and 800 cc. of a solution of ammonium dichromate containing approximately 140 g. of chromium oxide. The mixture was dried in an oven at 250° F. and then activated by heating to 850° F.

The product was a hard, adsorptive material comprising 76.5% aluminum oxide, 5.4% silicon dioxide, 15.2% chromium oxide, 1.8% cerium oxide, and 1.7% potassium oxide. It had a surface area of 382 square meters per gram. It is useful in aromatization or low pressure (25–75 p. s. i. g.) hydroforming processes.

Example 15

A slurry of hydrous alumina was prepared from 432 g. of aluminum metal as described in Example 4. Acetic acid was added in the ratio of 5 liters of acetic acid per 100 pounds of aluminum metal. The acidified slurry was allowed to stand for 5 hours and then impregnated with 117 g. of ammonium metavanadate dissolved in approximately 3 liters of distilled water. The impregnated slurry was dried in an oven at 250° F. and then activated by heating to 850° F.

The catalyst resulting comprised 90% aluminum oxide and 10% vanadium oxide. It had a surface area of 307 square meters per gram. This catalyst is useful for hydroforming or dehydrogenation processes.

Example 16

A slurry of hydrous alumina was prepared from 432 g. of aluminum metal as described in Example 4. This was impregnated with 98 g. of "soluble" tungstic acid dissolved in approximately 2 liters of water containing 80 cc. of 28% ammonia. 75 cc. of acetic acid were added to the impregnated slurry and the mixture was dried in an oven at 250° F. and activated by heating to 850° F.

The resultant catalyst comprised 90% aluminum oxide and 10% tungsten trioxide and had a surface area of 291 square meters per gram. It is useful for hydrogenation and catalytic cracking processes.

Example 17

432 g. of aluminum metal were dissolved in 16 liters of a 50/50 mixture of amyl alcohol and petroleum distillate boiling in the range of 300° F. to 400° F. A trace of mercuric chloride was used as a catalyst. The solution of aluminum amylate was hydrolyzed with 16 liters of water. The layer of petroleum distillate and regenerated amyl alcohol layer was decanted from the alumina slurry thus formed. The petroleum distillate and regenerated alcohol were dried by distilling out the small amount of water and reused in a subsequent catalyst preparation. 364 grams of boric acid were dissolved in the alumina slurry and the mixture was dried in an oven at approximately 250° F. and activated by heating to 850° F.

This catalyst was used to crack an East Texas gas oil of 33.8° API boiling in the range of 485° F. to 700° F. Cracking conditions were 950° F., 2.0 v./v./hr. and 30 minutes process period. The yield of liquid product boiling below 400° F. was 44 volume per cent based on the gas oil feed. The gasoline cut of the product analyzed 25% aromatics, 35% olefins, and 40% paraffins.

Example 18

A silica hydrosol was prepared by mixing equal volumes of sulphuric acid solution, sp. gr. 1.19, and of sodium silicate ($Na_2O.3.25SiO_2$) solution, sp. gr. 1.21. In this preparation, the silicate was added slowly to the acid with stirring. The silica hydrosol was allowed to stand for 24 hours during which time it set to a firm hydrogel. The hydrogel was washed with distilled water till it was free of soluble ions. This silica hydrogel contained approximately 90% water and 10% silicon dioxide.

A slurry of hydrous alumina was prepared from 432 g. of aluminum metal as described in Example 4. This alumina slurry, 19 kg. of the above silica hydrogel, and acetic acid in the ratio of 5 liters of acetic acid per 100 pounds of aluminum metal were ground together in a ball mill for 16 hours. The homogenized slurry was then dried in an oven at 250° F. and activated by heating to 850° F.

The product resulting was a hard, highly adsorptive material comprising 30% aluminum oxide and 70% silicon dioxide and had a surface area of 367 square meters per gram. It is useful as a catalyst in catalytic cracking operations.

*Example 19*

27 g. of aluminum were dissolved in 1 liter of 50/50 normal amyl alcohol-petroleum distillate solution as described in Example 1. The alcoholic solution was treated with 2 liters of 0.1 N-acetic acid. There was formed a slurry of hydrous alumina from which the petroleum distillate and regenerated alcohol were decanted and dried for reuse as described in Example 1. The slurry was placed in an oven at 220° F. After a few hours in the oven, the alumina had become peptized forming a hydrosol rather than the slurry of gelatinous alumina.

The alumina hydrosol was concentrated to approximately 6% solid content by evaporation and was emulsified with approximately 10 times its volume of naphtha, using "Aerosol" as an emulsifying agent. A small amount of morpholine was added to the oil prior to the emulsification so as to give the sol a pH of about 9 after emulsification which is favorable for the gelation of the alumina sol. The gelation occurred rather rapidly but the mass was stirred during the entire setting period which is completed in about an hour. The gel particles were separated by filtration and activated by heating to 350° F. The sizes of the gel microspheres so formed were of 60 to 100 microns and were of uniform shape. This material is an excellent adsorbent for organic vapors and is useful as a catalyst or a catalyst base in desulfurization processes, catalytic cracking, hydroforming, and the like.

*Example 20*

A silica hydrosol was prepared by mixing equal volumes of sulphuric acid solution, sp. gr. 1.19, and of sodium silicate ($Na_2O.3.25SiO_2$) solution, sp. gr. 1.21. In this preparation, the silicate was added slowly to the acid with stirring. The silica hydrosol was allowed to stand for 24 hours during which time it set to a firm hydrogel. The hydrogel was washed with distilled water till it was free of soluble ions. This silica hydrogel contained approximately 90% water and 10% silicon dioxide.

A slurry of hydrous alumina was prepared from 432 g. of aluminum metal as described in Example 4. This alumina slurry, 12.25 kg. of the above silica hydrogel, and acetic acid in the ratio of 5 liters of acetic acid per 100 pounds of aluminum metal were ground together in a ball mill for 16 hours. The homogenized slurry was then dried in an oven at 250° F. and activated by heating to 850° F.

The product resulting was a hard, highly adsorptive material comprising 40% aluminum oxide and 60% silicon dioxide and had a surface area of 451 square meters per gram. It is useful as a catalyst in catalytic cracking operations. This catalyst was used to crack an East Texas gas oil of 33.8° API boiling in the range of 485° F. to 700° F. Cracking conditions were 950° F., 2.0 v./v./hr. and 30 minutes process period. Of the liquid product 50.6% boiled in the gasoline boiling range. The gasoline cut analyzed 19% aromatics, 26% naphthenes, 34% olefins, and 21% paraffins. The yield of coke was 6.8% on feed.

Instead of using naphtha as a suspending medium in the emulsification process as described above, other water-immiscible liquids such as kerosene, benzene, carbon tetrachloride, hydrocarbon oils, etc. may be used. Partially water-miscible liquids such as butanol, may also be used, and in these cases the partially water-miscible liquid aids in the drying of the microspheres since the partially water-miscible liquid extracts water from the gel particles during the emulsification step.

Operable variations of the preparation of hydrogel microspheres include formation of the water slurry of hydrous alumina and then drying by spraying the slurry into a gas such as air or flue gas which is at a temperature within a range of 150° F. to 800° F.

The slurry may also be sprayed into an atmosphere that is chemically active such as an atmosphere containing ammonia, methylamine, sulphur dioxide, hydrogen sulphide, boron trifluoride, and the like. The water slurry may also be converted to a hydrosol as described in Example 19, and then dried in the form of microspheres by the spray drying technique. Solutions of a source of catalytic or promoter material may be added to the water slurry of hydrous alumina before drying, or to the dried alumina hydrogel microspheres after drying whether the microspheres are made by the emulsification of the hydrosol, by spray drying the hydrosol, or by spray drying the water slurry of hydrous alumina. These solutions of catalytic or promoter materials include solutions of a silica hydrosol, ammonium molybdate, ammonium dichromate, ammonium metavanadate, potassium dichromate, potassium nitrate, cerium nitrate, calcium nitrate, chromic acid, boric acid, tungstic acid, etc.

Although the described embodiment of the invention is a continuous process, the invention may be carried out as a batch process with only minor changes in the described steps obvious to one familiar with the art.

While the specific examples above given on hydroforming and catalytic cracking processes recite the preferred conditions of temperature and pressure, the following ranges may be used. For hydroforming reactions, the temperature may vary between 850 and 1100° F., the pressure between atmospheric and 400 p. s. i. g., the hydrocarbon feed rate between 0.1 and 2.0 volume of liquid feed per volume of catalyst per hour and the hydrogen feed rate between 1,000 and 4,000 cu. ft. under standard conditions per barrel of feed.

In catalytic cracking processes, temperatures may vary from 850 to 1100° F., pressures from atmospheric to 100 p. s. i. g. and the feed rate from 0.2 to 4 volumes of oil per volume of catalyst per hour. Fluid catalyst/feed ratios from 1:1 to 30:1 may be used in the fluid bed process.

Although in the examples given above, the catalytic materials made by the process were dried at temperatures of 250° F. and were activated by heating to 850° F., these temperatures are not critical. The catalytic material is dried until the moisture content is reduced from 5 to 30% by weight. This drying may be carried out at temperatures ranging from 250 to 400° F.

Cracking catalysts are activated by heating to a temperature within the range of 800 to 1100° F. for a period of from 1 to 8 hours, preferably 3 hours. Hydroforming catalysts are activated by heating to a temperature within a range of 850 to 1450° F. for from 1 to 8 hours, preferably 6 hours. However, the activation may be omitted entirely, if desired.

In hydrocarbon conversion operations where carbonaceous material is deposited on the catalytic material, it is contemplated that the catalytic material will be regenerated by treating it with a regenerating gas such as air or other suitable gases and regenerated catalyst reused.

Catalytic substances other than those described above may be prepared according to this invention. Alumina and alumina based catalysts used in processes such as adsorption, dehydration, dehydrogenation, hydrogenation, esterification, isomerization, condensation, polymerization, and amination may be prepared by this process.

What is claimed is:

1. A process for producing alumina-containing products which comprises introducing aluminum metal and substantially water-insoluble anhydrous alcohol into a reaction zone to react the metal and alcohol and form a solution of an aluminum alcoholate, removing the aluminum alcoholate solution from said reaction zone and mixing it with an excess of an aqueous medium to hydrolyze the aluminum alcoholate to form a slurry of hydrous alumina and alcohol, passing the hydrolyzed mixture to a separating zone to allow water insoluble alcohol to separate as a layer separate from the water slurry of the hydrous alumina, recovering alumina from the slurry of hydrous alumina, withdrawing separated water insoluble alcohol and drying it to remove water and recycling the dried alcohol to said reaction zone for reaction with an additional amount of aluminum.

2. A process according to claim 1 wherein the substantially water insoluble alcohol contains normal amyl alcohol.

3. A process according to claim 1 wherein the alcohol contains four or more carbon atoms per molecule and has a solubility in water of less than about 15 grams per 100 cc. under standard conditions.

4. A process for producing alumina-containing products which comprises introducing aluminum metal and substantially water-insoluble anhydrous alcohol and petroleum distillate into a reaction zone to react the metal and alcohol and form a solution of an aluminum alcoholate, removing the aluminum alcoholate solution from said reaction zone and mixing it with an excess of water to hydrolyze the aluminum alcoholate to form a slurry of hydrous alumina and alcohol, passing the hydrolyzed mixture to a separating zone to allow water insoluble alcohol and petroleum distillate to separate as a layer separate from the water slurry of the hydrous alumina, recovering alumina from the slurry of hydrous alumina, withdrawing separated water insoluble alcohol and petroleum distillate and drying it to remove water and recycling the dried alcohol and petroleum distillate to said reaction zone for reaction of the alcohol with an additional amount of aluminum.

5. A process according to claim 4 wherein the substantially water insoluble alcohol contains normal amyl alcohol.

6. A process according to claim 4 wherein the alcohol contains four or more carbon atoms per molecule and has a solubility in water of less than about 15 grams per 100 cc. under standard conditions.

7. A process for producing alumina containing materials which comprises reacting metallic aluminum with a substantially water insoluble alcohol in the presence of a promoter agent to form a solution of an aluminum alcoholate, recovering the aluminum alcoholate solution and mixing it with an excess of an aqueous medium to hydrolyze the alcoholate, allowing the regenerated alcohol to separate from the hydrous alumina in a settling zone, passing the regenerated alcohol to a drying zone, drying the regenerated alcohol in said drying zone, condensing the overhead from the drying zone and passing it to a separation zone, allowing the said condensate to separate into a water layer and a regenerated alcohol layer in the separation zone, returning the regenerated alcohol layer to said drying zone, withdrawing the dried regenerated alcohol from said drying zone and returning it to the process for reaction with further amounts of metallic aluminum and removing the hydrous alumina from said settling zone.

8. In a process for reacting an alcohol and aluminum metal to form an aluminum alcoholate wherein aluminum metal is reacted with a substantially anhydrous alcohol to form the alcoholate which is then hydrolyzed with an aqueous solution to form hydrous alumina, the improvement which comprises using a substantially water insoluble anhydrous alcohol as the alcohol to be reacted with the aluminum metal so that upon hydrolysis of the aluminum alcoholate and settling, an aqueous slurry of hydrous alumina and a separate layer of the water insoluble alcohol are formed and the separated water insoluble layer is withdrawn and dried to free it substantially of water and the dried water insoluble alcohol is then reused without further treatment for reaction with additional aluminum metal for the production of additional aluminum alcoholate.

9. A process for producing alumina-containing products which comprises introducing aluminum metal and substantially water-insoluble anhydrous alcohol and a petroleum distillate boiling within the range of 200°–500° F. into a reaction zone to react the metal and alcohol and form a solution of an aluminum alcoholate, removing the aluminum alcoholate solution from said reaction zone and mixing it with an excess of water to hydrolyze the aluminum alcoholate to form a slurry of hydrous alumina and alcohol, passing the hydrolyzed mixture to a separating zone to allow water insoluble alcohol and petroleum distillate to separate as a layer separate from the water slurry of the hydrous alumina, recovering alumina from the slurry of hydrous alumina, withdrawing separated water insoluble alcohol and petroleum distillate and drying it to remove water and recycling the dried alcohol and petroleum distillate to said reaction zone for reaction of the alcohol with an additional amount of aluminum.

10. A process which comprises reacting metallic aluminum in a reaction zone with a mixture comprising a sustantially water-insoluble alcohol and petroleum distillate in the presence of a promoter agent to form a solution of aluminum alcoholate, recovering the aluminum alcoholate solution and mixing it with an excess of an aqueous medium to hydrolyze the aluminum alcoholate and form a slurry of alumina, allowing the regenerated alcohol-petroleum distillate to separate from the water slurry of hydrous alumina in a settling zone, passing the regenerated alcohol-petroleum distillate mixture to a drying zone, drying the mixture of regenerated alcohol-petroleum distillate in said drying zone, condensing the overhead from the drying zone and passing it to a separation zone, allowing the said condensate to separate into a water layer and a regenerated alcohol-petroleum distillate layer in the separation zone, returning the last-mentioned regenerated alcohol-petroleum distillate layer to said drying zone, withdrawing the dried regenerated alcohol-petroleum distillate mixture from said drying zone and returning it to said reaction zone for reaction with more aluminum, removing the hydrous alumina from said settling zone to a second drying zone and drying the hydrous alumina.

11. A process for producing alumina-containing substances which comprises reacting in a reaction zone metallic aluminum with a mixture comprising a substantially water insoluble anhydrous alcohol and a petroleum distillate in the presence of a promoter agent to form a solution of an aluminum alcoholate, recovering the aluminum alcoholate solution and mixing it with an excess of water to hydrolyze the aluminum alcoholate to form hydrous alumina and alcohol, allowing the alcohol-petroleum distillate mixture to separate from the hydrous alumina as a separate layer, removing and drying the alcohol-petroleum distillate mixture, recovering the hydrous alumina and returning said dried alcohol-petroleum distillate mixture to said reaction zone for further reaction with aluminum.

12. A process for producing alumina-containing substances which comprises reacting metallic aluminum with a substantially water-insoluble anhydrous alcohol to form an aluminum alcoholate, hydrolyzing the aluminum alcoholate with an excess of an aqueous medium to form hydrous alumina and alcohol, allowing the alcohol to separate from the aqueous slurry of hydrous alumina as a separate layer, recovering and drying the separated alcohol, returning said dried alcohol to the process for further reaction with aluminum and recovering hydrous alumina from the reaction.

13. A process according to claim 12 wherein the slurry of hydrous alumina is settled to concentrate it and water withdrawn from above the concentrated slurry is used as the aqueous medium for hydrolyzing the aluminum alcoholate.

CHARLES N. KIMBERLIN, JR.

References Cited in the file of this patent

UNITED STATES PATENTS

| Number | Name | Date |
|---|---|---|
| 1,929,942 | Barclay | Oct. 10, 1933 |
| 2,258,099 | Patrick | Oct. 7, 1941 |
| 2,292,708 | Mavity | Aug. 11, 1942 |
| 2,296,395 | Michael et al. | Sept. 22, 1942 |
| 2,317,803 | Reeves et al. | Apr. 27, 1943 |
| 2,345,600 | Head et al. | Apr. 4, 1944 |
| 2,378,208 | Fuller et al. | June 12, 1945 |
| 2,437,531 | Huffman | Mar. 9, 1948 |
| 2,491,033 | Byrns et al. | Dec. 13, 1949 |
| 2,510,189 | Nahin et al. | June 6, 1950 |

OTHER REFERENCES

"Organic Chemistry"—Paul Karrer—3rd Ed.—1947—Elservier Pub. Co., N. Y.—p. 84.